United States Patent
Tsao et al.

(10) Patent No.: US 6,458,084 B2
(45) Date of Patent: Oct. 1, 2002

(54) ULTRASONIC DIAGNOSIS APPARATUS

(75) Inventors: Jing-Wen Tsao; Kenji Kumasaki; Takashi Itoh; Tatsuya Wakamatsu, all of Mitaka (JP)

(73) Assignee: Aloka Co., Ltd. (JP)

( * ) Notice: Subject to any disclaimer, the term of this patent is extended or adjusted under 35 U.S.C. 154(b) by 34 days.

(21) Appl. No.: 09/785,110

(22) Filed: Feb. 16, 2001

(30) Foreign Application Priority Data

Feb. 17, 2000 (JP) ........................................ 2000-039174
Sep. 7, 2000 (JP) ........................................ 2000-271224

(51) Int. Cl.[7] ................................................. A61B 8/00
(52) U.S. Cl. ...................................... 600/443; 600/458
(58) Field of Search .................... 600/437, 440–447, 600/458, 459; 73/625, 626; 367/7, 11, 130, 138; 424/9.5, 9.51

(56) References Cited

U.S. PATENT DOCUMENTS

| | | | |
|---|---|---|---|
| 4,844,082 A | | 7/1989 | Fukukita et al. |
| 5,632,277 A | | 5/1997 | Chapman et al. |
| 5,706,819 A | | 1/1998 | Hwang et al. |
| 5,724,976 A | * | 3/1998 | Mine et al. ................. 600/459 |
| 5,902,243 A | | 5/1999 | Holley et al. |
| 5,951,478 A | | 9/1999 | Hwang et al. |
| 5,961,463 A | | 10/1999 | Rhyne et al. |
| 6,095,980 A | | 8/2000 | Burns et al. |
| 6,231,512 B1 | * | 5/2001 | Chiao et al. ................. 600/447 |

FOREIGN PATENT DOCUMENTS

| | | | |
|---|---|---|---|
| DE | 3812434 A1 | * 10/1989 | ............ A61B/8/00 |
| JP | 60-53133 | 3/1985 | |

OTHER PUBLICATIONS

Akira Nakamura, "Nonlinear Behavior of Sound and Its Application", Japanese Journal of Applied Physics, vol. 27, Jan. 5, 1988, Supp. 27–1, pp. 17–20.

B. Schrope et al, "Simulated Capillary Blood Flow Measurement Using a Nonlinear Ultrasonic Contrast Agent", Ultrasonic Imaging 14, pp. 134–158 (1992).

Iwaki Akiyama et al., "Reflection Imaging of Nonlinearity Parameter Distribution", Japaneses Journal of Applied Physics, vol. 30, Feb. 13, 1991, Supp 30–1, pp. 221–223.

Tomoo Kamakura et al, "Nonlinearly Generated Waveform Distortion of Ultrasonic Pulses", The Journal of the Acoustical Society of Japan, vol. 46, No. 10, 1990, pp. 1–19.

* cited by examiner

Primary Examiner—Marvin M. Lateef
Assistant Examiner—Ali M. Imam
(74) Attorney, Agent, or Firm—Cantor Colburn LLP

(57) ABSTRACT

In an ultrasonic diagnosis apparatus, a first transmission signal including both of two fundamentals of frequencies $f_0$ and $2f_0$ is transmitted, and then a second transmission signal having a polarity reverse that of the first transmission signal is transmitted. A receiving beam processor 22 generates a signal in which the echoes of the two transmission signals are added, and a signal in which the echoes are subtracted. The fundamental components are canceled out by addition and a secondary harmonic component $A_2$ generated by the non-linear interaction remains in the sum signal. In the subtraction signal, the fundamental component remains while the secondary harmonic component is canceled out by subtraction. The fundamental component $A_{II}$ of the frequency $2f_0$ is extracted from the subtraction signal, and a ratio $(A_2/A_{II})$ is calculated by a divider 44. A differentiating process is then executed by an HPF 46 to obtain the evaluation value reflecting the non-linear parameter at each depth of the body.

18 Claims, 5 Drawing Sheets

ULTRASONIC DIAGNOSIS APPARATUS

BACKGROUND OF THE INVENTION

1. Field of the Invention

The present invention relates to an ultrasonic diagnosis apparatus, and more particularly to an apparatus for performing diagnosis based on secondary harmonic information generated by a living body.

2. Description of the Related Art

In recent years, a physical quantity known as the "non-linear parameter" has gained attention in the field of observation and diagnosis of the interior of a living body using ultrasound. This non-linear parameter represents the degree of non-linear interaction of an acoustic wave with a medium, such as body tissue or an ultrasonic contrast agent comprising microbubbles. It is presumed that, based on the non-linear parameter, information such as the water content of the body tissue can be obtained, and the contrasting effect of the ultrasonic contrast agent can be achieved.

Based on the phenomenon that sound velocity increases as sound pressure becomes higher, distortion generated in an ultrasound propagating through a body is induced by the acoustic non-linearity of the body tissue, thereby accumulatively producing secondary harmonic component. In addition, secondary harmonic echo is generated based on the non-linear vibration characteristic of the ultrasonic contrast agent. It is known that, when distortion of an ultrasound is not large, the amplitude of the produced secondary harmonic is proportional to the intensity (square of the amplitude) of the fundamental. Further, the amplitude of the secondary harmonic depends on the non-linear parameter of the medium.

In view of the above, transmission of the fundamental of the center frequency $f_0$ to the medium, and then defining the non-linear parameter based on the secondary harmonic component of the frequency $2f_0$ included in the received echo, has been conventionally proposed.

When the intensity of the transmitted ultrasound is $P_0(f_0)$, the distance from the probe is z, and the frequency-dependent attenuation coefficient $\alpha(f,z)$ is a function of the frequency f and the distance z, the amplitude $A_2(z)$ of the secondary harmonic of the echo signal received from scatterers having a backscattering characteristic $\gamma(f,z)$ can be represented by the following equation.

$$A_2(z) = P_0(f_0) \cdot \exp(-2\int \alpha(f_0,z)dz) \cdot \exp(-\int \alpha(2f_0,z)dz) \cdot \gamma(2f_0,z) \cdot \int h(z)dz \quad (1)$$

The factor "$P_0(f_0)\cdot\exp(-2\int \alpha(f_0,z)dz)$" on the right side of the equation (1) represents the intensity of the transmitted fundamental which has been attenuated by the distance z. The factor "2" in the exponent is derived from the fact that the distortion is proportional to the square of the amplitude (intensity) of the fundamental. The next factor "$\exp(-\int \alpha(2f_0,z)dz)$" represents the attenuation to which the secondary harmonic scattered wave was subjected in the distance z until reaching the probe. The factor "h(z)" in the final integrating factor is a term reflecting the non-linear parameter (B/A) of the medium in the distance z. This term can be represented by the following equation including the sound velocity $C_0$ and the density $\rho_0$ of the medium during equilibrium. The value of B/A is known to be about 5 to 11 in a body tissue, while much greater in a microbubble medium.

$$h = (B/A + 2) \cdot 2\pi f_0 / (4\rho_0 C_0^3) \quad (2)$$

In the body tissue, the final factor is obtained by integrating h(z) with respect to the distance z. This factor is provided corresponding to the accumulation of the secondary harmonic information generated along the propagation of the transmitted ultrasound. It is assumed, however, that secondary harmonic component generated by the non-linear vibration of the ultrasonic contrast agent does not accumulate, and that h(z) is not integrated with respect to the distance.

As is understood from the equation (1), secondary harmonic component included in an echo signal includes a factor dependent on the frequency-dependent attenuation characteristic $\alpha$ and the backscattering characteristic $\gamma$. Such secondary harmonic information, can therefore not be directly used as an evaluation value of the non-linear parameter.

Under the above circumstances, Akiyama et al. proposed, in Japanese Journal of Applied Physics, vol.30, supplement 30-1 (1991), re-transmitting the fundamental toward the same location in the body with the center frequency of the transmitted fundamental set to $2f_0$, and removing the influence of the attenuating characteristic and the scattering characteristic by making use of the phenomenon that the echo signal is subjected to the same attenuating and scattering characteristics as those of the secondary harmonic $A_2(z)$.

Specifically, in the system proposed by Akiyama, the influence of the attenuating and scattering characteristics is removed by the following processing. Assuming that the amplitude of the transmitted fundamental having the center frequency of $2f_0$ is $A_0(2f_0)$, the fundamental amplitude $A_H(z)$ of the received echo signal is represented by the following equation.

$$A_H(z) = A_0(2f_0) \cdot \exp(-2\int \alpha(2f_0,z)dz) \cdot \gamma(2f_0,z) \quad (3)$$

The constant "2" in the exponent of the attenuating factor in the equation (3) is provided corresponding to the roundtrip propagation.

The frequency-dependent attenuation characteristic $\alpha$ of the body tissue is generally linear, and therefore satisfies the following equation.

$$\alpha(2f_0,z) = 2\cdot\alpha(f_0,z) \quad (4)$$

By dividing the equation (1) by the equation (3), and using the equation (4), the following equation in which the influence of the attenuating characteristic $\alpha$ and the scattering characteristic $\gamma$ is eliminated can be obtained.

$$A_2(z)/A_H(z) = (P_0(f_0)/A_0(2f_0)) \cdot \int h(z)dz \quad (5)$$

Upon differentiating the above equation by the distance z, h(z) can be given by the following equation.

$$h(z) = d\{A_2(z)/A_H(z)\}/dz \cdot \{A_0(2f_0)/P_0(f_0)\} \quad (6)$$

Because $P_0(f_0)$ and $A_0(2f_0)$ are the intensity and the amplitude of the transmission and are known, h(z) reflecting the non-linear parameter (B/A) can be estimated from the equation (6) using $A_2(z)$ and $A_H(z)$.

In one method for obtaining the amplitude $A_2(z)$ of the secondary harmonic from the echo signal when the fundamental is transmitted, the band of the fundamental may be removed from the echo signal by using a band pass filter (BPF). However, using this method, the secondary harmonic component, being weak, cannot be accurately detected when the band of the fundamental and the band of the secondary harmonic overlap one another.

As a technique for solving the above problem, Kamakura et al. proposed a method in The Journal of the Acoustical Society of Japan, vol.46, No.10 (1990). In this method, two pulses both having the center frequency $f_0$ which differ from one another only in the signs are transmitted, thereby allowing separation of the fundamental and the secondary harmonic in the time domain to be performed by simple addition or subtraction of the echo signals of the two transmissions. According to this method, by adding the echo signals, the two fundamental components opposite in polarity cancel out one another, and only the secondary harmonic component can be extracted. On the other hand, by subtracting the echo signals of the two transmissions, only the fundamental component can be extracted.

As described above, according to the conventional techniques, in order to extract the secondary harmonic component at high precision so as to calculate the evaluation value of the non-linear parameter from which the influence of the attenuating and scattering characteristics is removed, it is necessary to twice transmit fundamentals having the frequency $f_0$ and differing polarity, and additionally transmit the fundamental having the frequency $2f_0$. In other words, the number of transmissions and receptions must undesirably be increased. When the number transmissions and receptions are increased with respect to one beam direction, the data rate becomes lowered. For that reason, when, for example, the non-linear parameter is visualized into an image, the frame rate is disadvantageously reduced. Further, error may be increased due to movement of the body tissue during a longer data acquisition time.

Moreover, because the main objective of the conventional art is the extraction and visualization of the evaluation values of the non-linear parameter, the influence of both the attenuating characteristic $\alpha$ and the scattering characteristic $\gamma$ within the body tissue is removed as described above. However, because the scattering characteristic $\gamma$ includes information concerning the body tissue structure, removing the scattering characteristic $\gamma$ results in de-emphasized expression of the tissue structure in an image. Depending on the purpose of the apparatus for diagnosis or the like, an image may be more useful when the image clearly displays, together with the evaluation values of the non-linear parameter, the body tissue structures that produce strong reflection and scattering echo, such as a muscle, a membrane or a valve. Using the above-described conventional technique, such a requirement cannot sufficiently be satisfied because the edges of the body tissue structures become blurred. To solve this problem, an arrangement may be devised to remove only the attenuating characteristic $\alpha$ from the amplitude $A_2$ of the secondary harmonic by using the STC (sensitivity time control) function of the apparatus. However, adjustment of the STC is uniform with respect to an azimuth direction, i.e., the STC cannot be adjusted for each of the ultrasonic beams. For this reason, the influence of the attenuating characteristic $\alpha$ cannot sufficiently be removed, and improvement of the image quality is inhibited or limited.

SUMMARY OF THE INVENTION

The present invention was conceived in view of the above problems. An object of the present invention is to provide an ultrasonic diagnosis apparatus which can evaluate a non-linear parameter with high precision using a simpler structure, and which provides an image having a high quality based on the evaluation value of the non-linear parameter.

According to the present invention, there is provided an ultrasonic diagnosis apparatus comprising a transmitter for transmitting toward a living body a first transmission signal and a second transmission signal reverse in polarity to the first transmission signal, the first transmission signal containing a first fundamental component of a center frequency $f_0$ and a second fundamental component of a center frequency $2f_0$; a receiver for outputting a first receiving signal corresponding to an echo of the first transmission signal and a second receiving signal corresponding to an echo of the second transmission signal; a sum signal generator for generating a sum signal based on addition of the first receiving signal and the second receiving signal; a difference signal generator for generating a difference signal based on subtraction between the first receiving signal and the second receiving signal; and an evaluation value calculator for calculating an evaluation value based on the sum signal and the difference signal.

According to the present invention, the evaluation value of a non-linear parameter or the like can be obtained by performing only twice each of transmission and reception of ultrasounds. In each of the transmissions, two fundamentals whose center frequencies are $f_0$ and $2f_0$, respectively, are transmitted together. Between the first and second transmissions, the phases of the respective frequency components are shifted from one another by 180°. As a result, the first and second transmission signals have reverse polarity and cancel when added. In the transmitter, a transmitter for transmitting the first transmission signal and a transmitter for transmitting the second transmission signal may be provided separately, or both of the first and second transmission signals may be generated by a common structure. Both of the first and second transmission signals are basically transmitted to the same portion of a living body at different timings, and their respective echoes are received by the receiver. The sum signal generator adds the first receiving signal and the second receiving signal, and outputs, as the sum signal, the addition result or a signal corresponding to the addition result. Further, the difference signal generator performs subtraction between the first receiving signal and the second receiving signal, and outputs, as the difference signal, the subtraction result or a signal corresponding to the subtraction result. Each of the first receiving signal and the second receiving signal contains components, basically derived from each transmission signal, with reverse polarity, and components with identical polarity generated by interaction with the body. Accordingly, the components with reverse polarity are canceled out in the sum signal, and the sum signal basically includes a signal corresponding to a component generated by the non-linear interaction between the ultrasound and the medium. On the other hand, the components with identical polarity are canceled out in the difference signal, and the difference signal mainly comprises the component derived from the transmission signals. The sum signal and the difference signal are similarly influenced in the body by the frequency-dependent attenuation characteristic, the backscattering characteristic, and the like. Accordingly, by using the sum signal and the difference signal, data processing can be performed to, for example, remove the influence. The evaluation value calculator calculates the evaluation value based on the sum signal and the difference signal.

In one aspect of the present invention, the transmitter of the ultrasonic diagnosis apparatus includes a first fundamental generator for generating the first fundamental component, and a second fundamental generator for generating the second fundamental component.

In an ultrasonic diagnosis apparatus according to another aspect of the present invention, the difference signal generator extracts, as the difference signal, the second fundamental component included in the subtraction result between the first receiving signal and the second receiving signal.

The sum signal may include mainly the secondary harmonic component generated by the non-linear interaction between the first fundamental component and the body. That is, the sum signal is subjected to a frequency-dependent influence, such as attenuation, in accordance with the frequency $2f_0$. On the other hand, the subtraction result generates a signal corresponding to the sum of the first and second fundamental components included in the first and second transmission signals, respectively. According to the present invention, the second fundamental component among those components is extracted as the difference signal. Because the difference signal consisting of the extracted second fundamental component is located in the same band as the main component of the sum signal, the difference signal receives the similar influence of attenuation or the like within the body. Accordingly, by using the present invention, the influence of attenuation or the like within the body can readily be canceled out and removed from the sum signal.

In one aspect of the present invention, the difference signal generator of the ultrasonic diagnosis apparatus comprises a band pass filter which passes and extracts the second fundamental component included in the subtraction result.

In an ultrasonic diagnosis apparatus according to a further aspect of the present invention, the evaluation value calculator calculates an amplitude ratio of the sum signal and the difference signal, and then calculates the evaluation value based on the amplitude ratio.

The influence of attenuation or the like within the body is represented as a multiplication factor with respect to the signal. According to the present invention, by calculating the amplitude ratio of the sum signal to the difference signal, this multiplication factor can be canceled out, and an evaluation value without the influence of the multiplication factor can be calculated.

According to another aspect of the present invention, the ultrasonic diagnosis apparatus further comprises a detector for detecting the respective amplitude modulations of the sum signal and the difference signal. In addition, the evaluation value calculator calculates the evaluation value based on a detection signal output from the detector, the detection signal corresponding to each of the sum signal and the difference signal.

The processing for calculating the evaluation value is executed mainly by employing the amplitude information of the sum signal and the difference signal. According to the present invention, a change in the amplitude of the sum signal and difference signal vibrating at the frequency about $2f_0$ is extracted as the detection signal. The use of the detection signal facilitates the processing for calculating the evaluation value.

The ultrasonic diagnosis apparatus according to another aspect of the present invention further comprises a differentiator for calculating a ratio of change over time of the amplitude ratio.

According to the present invention, the change ratio of the amplitude ratio in the respective depths on a path of the ultrasound is obtained by calculating the ratio of change over time of the amplitude ratio. The evaluation value at the respective points on the ultrasound path can then be defined by using the change ratio of the amplitude ratio as the function of the depth.

In a preferred embodiment of the present invention, the differentiator of the ultrasonic diagnosis apparatus comprises a high pass filter.

An ultrasonic diagnosis apparatus according to a still further aspect of the present invention comprises an image generator for generating a tomographic image based on the evaluation value of a sectional plane of the body.

According to the present invention, the evaluation values at the respective points of a sectional plane of the body are obtained by scanning the body with the ultrasound transmitted from the transmitter. Visualizing the evaluation values as an image enables observers to readily perform diagnosis of a body based on the evaluation values.

Further, according to another aspect of the present invention, there is provided an ultrasonic diagnosis apparatus comprising a transmitter for transmitting toward a living body a first transmission signal and a second transmission signal reverse in polarity to the first transmission signal, the first transmission signal containing a first fundamental component of a center frequency $f_0$ and a second fundamental component of a center frequency $2f_0$; a receiver for outputting a first receiving signal corresponding to an echo of the first transmission signal and a second receiving signal corresponding to an echo of the second transmission signal; a sum signal generator for generating a sum signal based on addition of the first receiving signal and the second receiving signal; a difference signal generator for generating a difference signal based on subtraction between the first receiving signal and the second receiving signal; an attenuation characteristic signal generator for generating, in accordance with the difference signal, an attenuation characteristic signal representative of the attenuation characteristic of the ultrasound corresponding to a depth; and a normalization circuit for normalizing the sum signal by using the attenuation characteristic signal, so as to output a normalization signal.

According to this aspect of the invention, the information pertaining to the non-linear interaction between the medium and the ultrasound is obtained via only twice of each of transmission and reception of ultrasounds, as in the above-described aspect. As was already described, the sum signal and the difference signal are similarly influenced within the body by the frequency-dependent attenuation characteristic and the backscattering characteristic. The attenuation characteristic signal generator generates the attenuation characteristic signal from the difference signal. The influence of the frequency-dependent attenuation characteristic of the ultrasound corresponding to a depth of the body present in the difference signal significantly remains in the attenuation characteristic signal, whereas the influence of the backscattering characteristic is partially-or completely removed. The normalization circuit normalizes the sum signal by using the attenuation characteristic signal to generate the normalization signal. The influence of the frequency-dependent attenuation characteristic present in the sum signal is removed from the normalization signal, whereas the influence of the backscattering characteristic remains in the normalization signal. In other words, the information on the non-linear interaction and the backscattering characteristic, which are found in the sum signal, remain in the normalization signal. Because this normalization signal includes the information on the backscattering characteristic, it is preferable for use in expression of the body tissue structure than is a signal including only the information on the non-linear interaction.

An ultrasonic diagnosis apparatus according to another aspect of the present invention further comprises a differentiator for differentiating the normalization signal to output a differentiation signal.

The component of the non-linear interaction included in the normalization signal corresponds to the integration of the non-linear interaction on a round-trip propagating path of the ultrasound up to the respective depths. According to the present invention, the normalization signal is differentiated with respect to the depthwise direction with the result that the obtained differentiation signal represents the intensity of the non-linear interaction in the respective depths on the path of the ultrasound.

In the ultrasonic diagnosis apparatus according to another aspect of the present invention, the attenuation characteristic signal generator suppresses a level fluctuation in the difference signal to generate the attenuation characteristic signal.

While the difference signal has a gradual macroscopic tendency for the signal from a deeper portion to become weaker in accordance with the attenuation characteristic of the ultrasound, level fluctuates, in a smaller distance scale, in accordance with the backscattering characteristic as influenced by the structure of the body tissue. The amplitude of the microscopic level fluctuation which may be caused by the backscattering characteristic can be relatively large. According to the present invention, the microscopic level fluctuation is suppressed to reduce the influence of the backscattering characteristic included in the difference signal, so as to generate the attenuation characteristic signal.

In the ultrasonic diagnosis apparatus according to the present invention, the attenuation characteristic signal generator clips a level fluctuation of the difference signal at a predetermined level and smoothes the difference signal after clipping, so as to generate the attenuation characteristic signal.

According to the present invention, a predetermined level of upper threshold, lower threshold, or both thresholds are designated with respect to level fluctuation of the difference signal. When the difference signal generates a level fluctuation that exceeds the threshold, a clipping process is executed to replace the signal value by the threshold value. Further, the clipped signal is smoothed to smooth out the microscopic level fluctuation. Through the clipping and smoothing process, the level fluctuation of the difference signal is suppressed, thereby allowing generation of the attenuation characteristic signal including a reduced influence of the backscattering characteristic.

In the ultrasonic diagnosis apparatus according to a preferred embodiment of the present invention, the above-noted predetermined level is a function of the depth. The difference signal has a tendency to reduce in level from a shallower portion of the body toward a deeper portion thereof due to the influence of the attenuation characteristic. Making use of this tendency, the predetermined level, which serves as the threshold of the difference signal, can be designated as a function of the depth so as to produce the attenuation characteristic signal in which the fluctuation due to the backscattering characteristic is favorably removed but the attenuation characteristic remains.

According to the present invention, there is provided an ultrasonic diagnosis apparatus comprising a transmitter for transmitting toward a living body a first transmission signal and a second transmission signal reverse in polarity to the first transmission signal, the first transmission signal containing a first fundamental component of a center frequency $f_0$ and a second fundamental component of a center frequency $2f_0$; a receiver for outputting a first receiving signal corresponding to an echo of the first transmission signal and a second receiving signal corresponding to an echo of the second transmission signal; a sum signal generator for generating a sum signal based on addition of the first receiving signal and the second receiving signal; a difference signal generator for generating a difference signal based on subtraction between the first receiving signal and the second receiving signal; a first logarithmic converter for logarithmically converting the sum signal to output a logarithmic format sum signal; a second logarithmic converter for logarithmically converting the difference signal to output a logarithmic format difference signal; an attenuation characteristic signal generator for generating, in accordance with the logarithmic format difference signal, a logarithmic format attenuation characteristic signal representative of the attenuation characteristic of the ultrasound corresponding to a depth; and a normalization circuit for normalizing the logarithmic format sum signal by using the logarithmic format attenuation characteristic signal, so as to output a logarithmic format normalization signal.

According to the present invention, after the difference signal is logarithmically converted, the attenuation characteristic signal including a reduced influence of the backscattering characteristic is generated. The logarithmic format sum signal is then normalized using the logarithmic format attenuation characteristic signal.

According to another aspect of the present invention, there is provided an ultrasonic diagnosis apparatus comprising a transmitter for transmitting toward a living body a first transmission signal and a second transmission signal reverse in polarity to the first transmission signal, the first transmission signal containing a first fundamental component of a center frequency $f_0$ and a second fundamental component of a center frequency $2f_0$; a receiver for outputting a first receiving signal corresponding to an echo of the first transmission signal and a second receiving signal corresponding to an echo of the second transmission signal; a sum signal generator for generating a sum signal based on addition of the first receiving signal and the second receiving signal; a difference signal generator for generating a difference signal based on subtraction between the first receiving signal and the second receiving signal; a first logarithmic converter for logarithmically converting the sum signal to output a logarithmic format sum signal; an attenuation characteristic signal generator for generating, in accordance with the difference signal, an attenuation characteristic signal representative of the attenuation characteristic of the ultrasound corresponding to a depth; a second logarithmic converter for logarithmically converting the attenuation characteristic signal to output a logarithmic format attenuation characteristic signal; and a normalization circuit for normalizing the logarithmic format sum signal by using the logarithmic format attenuation characteristic signal, so as to output a logarithmic format normalization signal.

According to the present invention, after the attenuation characteristic signal including a reduced influence of the backscattering characteristic is generated from the difference signal, logarithmic conversion is conducted to generate the logarithmic format attenuation characteristic signal. The logarithmic format sum signal is then normalized using the logarithmic format attenuation characteristic signal.

DESCRIPTION OF THE PREFERRED EMBODIMENTS

Embodiment 1

[Principle]

Figure 1:
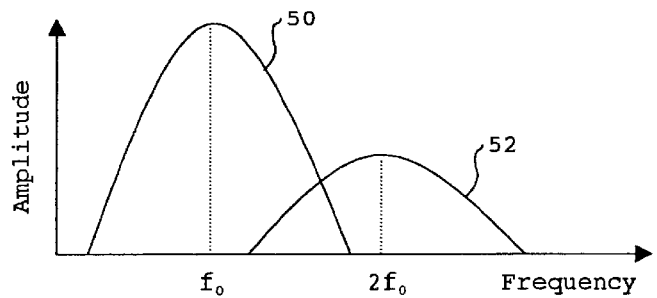
FIG. 1 is a schematic diagram showing the frequency spectrums of each transmission signal transmitted by an ultrasonic diagnosis apparatus in accordance with a first embodiment of the present invention.

FIG. 1 is a schematic diagram showing the frequency spectrums of each transmission signal transmitted from an ultrasonic diagnosis apparatus in accordance with a first preferred embodiment of the present invention. The present apparatus transmits toward a living body two transmission signals with reverse polarity. In each of the two transmission signals, a fundamental of a center frequency $f_0$ (first fundamental 50) and a fundamental of a center frequency $2f_0$ (second fundamental 52) are synthesized. Subsequently, echoes of the two transmissions are received.

Within the body, a secondary harmonic is generated by the non-linearity of the acoustic interaction. That is, the secondary harmonic (amplitude $A_2$) of the frequency $2f_0$ is generated in the body with respect to the first fundamental. This secondary harmonic is proportional to the square (intensity) of the transmitting sound pressure, but does not depend on the polarity of the transmission waveform. Accordingly, when the two received signals are added, the components included in the echo which are derived from the transmission signals and reverse in polarity to one another are canceled out, and, as a result, a signal containing twice the secondary harmonic component, i.e., $2A_2$, is produced. On the other hand, when the two received signals are subtracted, the secondary harmonic component generated in the body is canceled out, and, as a result, a signal containing twice the reflective wave components of the first fundamental and the second fundamental is produced. The above-noted $2A_{II}$ can be obtained by, for example, extracting the band of the second fundamental using a BPF.

In the present apparatus, as described above, the first fundamental and the second fundamental are synthesized and transmitted. Subsequently, the sum and difference of the received signals are generated to obtain the signals $A_2$ and $A_{II}$. After those signals are detected by envelope detection, a ratio $(A_2/A_{II})$ is calculated by a divider. Through calculation of the ratio, the influence of the frequency-dependent attenuation characteristic and the backscattering characteristic in the body can be eliminated, allowing to obtain information pertaining to the secondary harmonic component within the body. Further, by performing differentiation with respect to the distance z, the term h(z) reflecting the non-linear parameter (B/A) at each depth in the body tissue can be obtained.

[Specific Structure and Operation]

Figure 2:
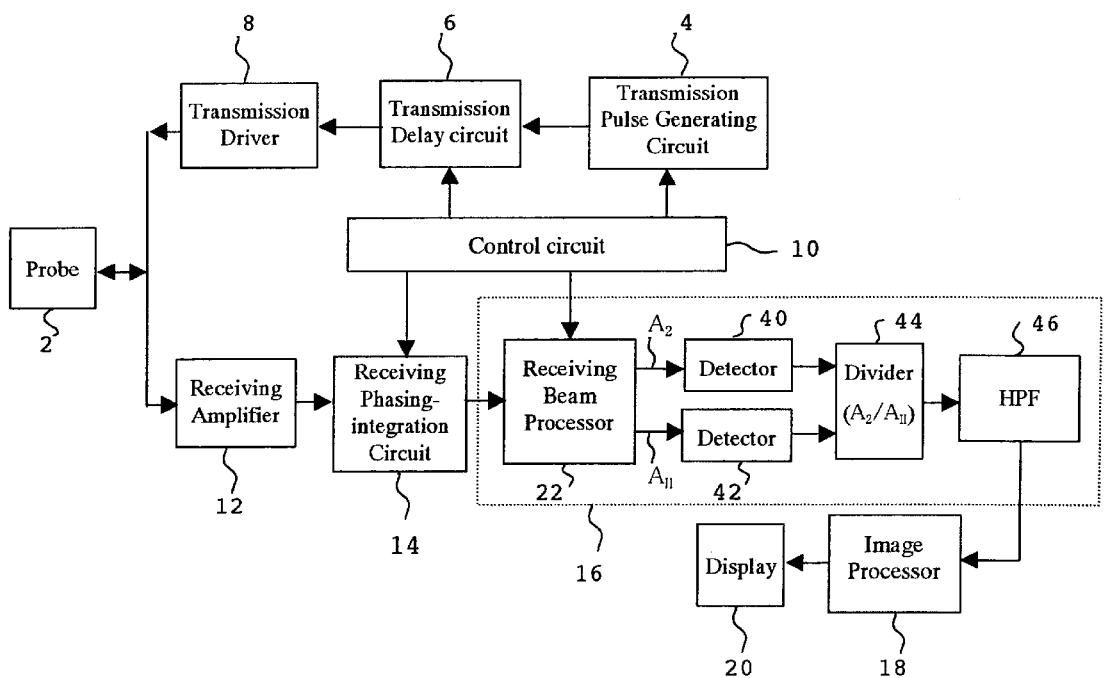
FIG. 2 is a block diagram showing a general configuration of an ultrasonic diagnosis apparatus in accordance with the first embodiment of the present invention.

A specific structure and operation of an ultrasonic diagnosis apparatus in accordance with this first embodiment of the present invention will next be described referring to the drawings. FIG. 2 is a block diagram showing the general configuration an apparatus configured according to the present embodiment. The transmission and reception of ultrasound between the apparatus and the body are conducted via a probe 2. The probe 2 may, for example, be configured using a transducer array capable of forming beams.

The transmission system comprises a transmission pulse generating circuit 4, a transmission delay circuit 6, and a transmission driver 8. Under the timing control by the control circuit 10, the transmission delay circuit 6 delays, for each channel of the transducer array, a transmission pulse generated and output by the transmission pulse generating circuit 4. The delay amount is determined by the control circuit 10 such that the transmitted ultrasound forms a beam. Further, by adjusting the delay amount of each channel, the control circuit 10 changes the direction of the transmitting beam, thereby performing control for scanning the body.

Upon receiving the transmission pulse delayed for each of the channels from the transmission delay circuit 6, the transmission driver 8 outputs a pulse that vibrates the transducer of each channel of the probe 2.

The transmission system of the present apparatus is adapted to simultaneously transmit the first fundamental and the second fundamental to the body. Aspects such as the shape of the transducers constituting the probe 2 may be adjusted to realize a transducer array capable of transmitting and receiving a certain frequency $f_0$ and twice the frequency $2f_0$. Such a transducer array can be used to realize transmission and reception of the two fundamentals at the same time. Further, the probe 2 may be composed of two transducer arrays which transmit and receive the frequencies $f_0$ and $2f_0$, respectively.

Furthermore, the transmission system of the present apparatus sequentially transmits, in the same beam axial direction, two transmission signals of reverse polarity. That is, under one beam forming condition in the transmission delay circuit 6, a pair of transmission signals of reverse polarity are sequentially transmitted from the probe 2. When the polarities of two transmission signals are reverse to one another, the change of amplitude over time of the two signals are in a reversed relationship. In such a case, the phases of the respective frequency components included in the two transmission signals are shifted from one another by 180° between those transmission signals. Such two transmission signals may be obtained, for example, by reversing the polarity of the voltage pulse supplied to the probe 2 by the transmission driver 8.

The receiving system comprises a receiving amplifier 12, a receiving phasing-integration circuit 14, a non-linearity evaluation value extracting section 16, an image processor 18 and a display unit 20. The receiving signals corresponding to the respective transducers (corresponding to the respective channels) are output from the probe 2. After being amplified by the receiving amplifier 12, the receiving signals are added together by the receiving phasing-integration circuit 14 operating under the control by the control circuit 10, to thereby generate one echo signal. The echo signal is input to the non-linearity evaluation value extracting section 16.

Figure 3A:
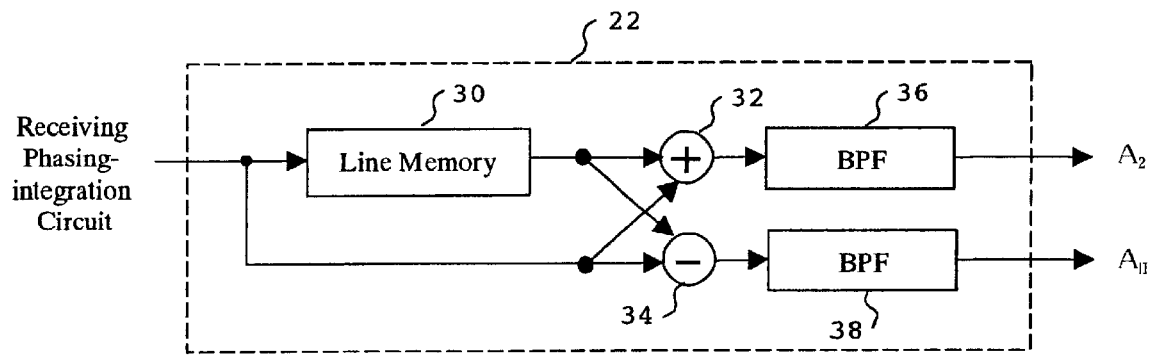
FIG. 3A is a block diagram showing a general configuration of a receiving beam processing circuit.
Figure 3B:
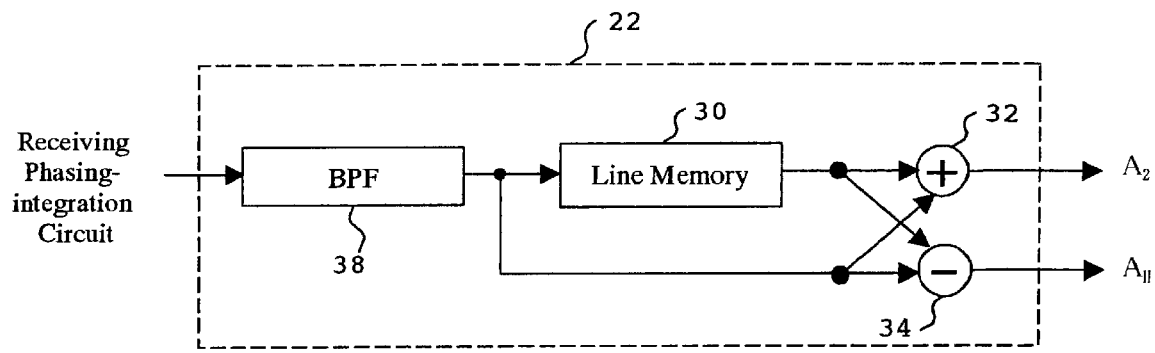
FIG. 3B is a block diagram showing another general configuration of a receiving beam processing circuit.

In the non-linearity evaluation value extracting section 16, the amplitude $A_2$ of the secondary harmonic component included in the echo signal and the echo amplitude $A_{II}$ of the second fundamental component are generated by a receiving beam processor 22. FIGS. 3A and 3B are block diagrams showing general configurations of the receiving beam processor 22. The receiving beam processor 22 generates $A_2$ and $A_{II}$ from the echo signals corresponding to a pair of transmission signals that were transmitted in the same direction in the body. Referring to FIG. 3a, an echo signal corresponding to a preceding transmission signal (first transmission signal) is input from the receiving phasing-integration circuit 14 and stored in the line memory 30. When an echo signal corresponding to a succeeding transmission signal (second transmission signal) is input from the receiving phasing-integration circuit 14, the second echo signal and the preceding echo signal read out from the line memory 30 are input to the adder 32 and the subtractor 34. The timing control of these operations is conducted by the control circuit 10. In accordance with the above-described principle, the signal output from the adder 32 is a signal mainly containing the secondary harmonic component because the two fundamental components are canceled out. The signal output from the subtractor 34 is a signal mainly containing the fundamental components because the harmonic component is canceled out.

Band pass filters (BPF) 36 and 38 disposed on the output ends of the adder 32 and the subtractor 34, respectively, extract components in the $2f_0$ band from the respective outputs. The output of the subtractor 34 includes the echo of the first fundamental and the echo of the second fundamental. From the output of the subtractor 34, the echo component of the second fundamental having the amplitude of $2A_{II}$ is extracted by the BPF 38. On the adder 32 side, the respective fundamental components included in the two echo signals are canceled out by addition. The secondary harmonic component having the amplitude of $2A_2$ should immediately be available from the output of the adder 32, and, accordingly, the BPF 36 can basically be omitted. However, taking into consideration the possibility that the transmission and reception timings of the two echo signals may not completely be identical, and that the fundamental component may therefore slightly remain, the BPF 36 is provided to improve precision of the secondary harmonic detection in the apparatus of the present embodiment.

The signals of the center frequency $2f_0$ output from the BPFs 36 and 38 are input to detectors 40 and 42, respectively. The detectors 40 and 42 detect the signals of the center frequency $2f_0$ by envelope detection, and extract the envelope amplitude signals. The amplitude signal output from the detector 40 represents a change of $2A_2$ over time, whereas the amplitude signal output from the detector 42 represents a change of $_2A_{II}$ over time.

FIG. 3B shows a configuration similar to that of FIG. 3A with the exception that one BPF is omitted in FIG. 3B.

A divider 44 divides the amplitude of the signal output from the detector 40 by the amplitude of the signal output from the detector 42 to obtain the ratio $(A_2/A_{II})$ of those amplitudes.

A change over time of the ratio output from the divider 44 represents a change in the value obtained by integrating, in the z-direction, the term h(z) reflecting the non-linear parameter (B/A) in each depth of the body. A high pass filter (HPF) 46 disposed on the output end of the divider 44 is a differentiator for calculating a ratio of change over time of the ratio $(A_2/A_{II})$. Using the HPF 46, a difference in the ratio $(A_2/A_{II})$ between depths close to one another can be generated. This difference corresponds to h(z) in the respective depths of the body.

The h(z) in the respective depths on one beam axis can thus be obtained. By scanning the ultrasonic beam, h(z) at the respective points in a sectional plane of the body can be obtained. The image processor 18 generates an image signal based on the h(z) at the respective points in the body sectional plane, the h(z) output from the non-linearity evaluation value extracting section 16. The display unit 20 then displays the image signal.

A user of the present apparatus can diagnose the interior of a body using the image displayed on the display unit 20 based on the evaluation values h(z) of the non-linear parameter.

It is to be noted that, while the differentiating process is conducted using the HPF 46 in this embodiment, the image may be formed without conducting the differentiating process by using the integrated value $\int h(z)dz$.

Embodiment 2

[Principle]

Similar as in the above-described first embodiment, the first fundamental and the second fundamental are synthesized and transmitted, and the sum and difference of the received signals are generated to obtain the signals $A_2$ and $A_{II}$.

The signal $A_{II}$ after its envelope detection includes a factor dependent on the frequency-dependent attenuation characteristic $\alpha$ and a factor pertaining to the backscattering characteristic $\gamma$, as represented by the equation (3). The multiplication term $\{\exp(-2\int\alpha(2f_0,z)dz\}$ dependent on the attenuation characteristic $\alpha$ of the signal $A_{II}$ gradually reduces with an increase in the depth z. The signal $A_{II}$ includes the scattering characteristic $\gamma$ as the multiplication term $\{\gamma(2f_0,z)\}$. The sign of $\gamma$ may either be positive or negative, and, in general, $\gamma$ can locally increase or decrease in accordance with the body tissue structure. In other words, it is presumed that the spatial change of $A_{II}$ caused by the attenuation characteristic $\alpha$ is by far gradual as compared to the spatial change of $A_{II}$ caused by the scattering characteristic $\gamma$. Accordingly, by removing or suppressing the local level fluctuation of $A_{II}$, a signal mainly comprising the influence of the attenuating characteristic $\alpha$ in the $A_{II}$ can be obtained. This signal is herein referred to as the attenuation characteristic signal $<A_{II}>$. In the signal $<A_{II}>$, the influence of the attenuation characteristic $\alpha$ included in the $A_{II}$ is retained, while the influence of the scattering characteristic $\gamma$ included in $A_{II}$ is removed or reduced. The ratio of reduction of the influence of the scattering characteristic $\gamma$ in $<A_{II}>$ with respect to the original signal $A_{II}$ is represented by k $(0 \leq k \leq 1)$. When the influence of the scattering characteristic $\gamma$ is completely removed, k=1.

The ratio $(A_2/<A_{II}>)$ of the signal $A_2$ after its envelope detection and the attenuation characteristic signal $<A_{II}>$ is represented by the following equation.

$$A_2(z)/<A_{II}(z)>=(P_0(f_0)/A_0(2f_0))\cdot k\cdot\gamma(2f_0,z)\cdot\int h(z)dz \qquad (7)$$

In this way, in $(A_2/<A_{II}>)$, the attenuation characteristics $\alpha$ included in $A_2$ and $<A_{II}>$ are canceled out and removed. Concerning the scattering characteristic $\gamma$, the scattering characteristic $\gamma$ of $A_2$ remains without being canceled by an amount corresponding to the scattering characteristic $\gamma$ removed from $<A_{II}>$. The scattering characteristic $\gamma$ contributes to expression of the body tissue structure. Accordingly, based on $(A_2/<A_{II}>)$, the evaluation values of the secondary harmonic information excluding the attenuation characteristic while retaining information on the body tissue structure can be obtained. By forming an image using the evaluation values, the image based on the secondary harmonic information can clearly express body tissue structures that generate strong reflection and scattering echo, such as a muscle, a membrane, or a valve.

[Specific Structure and Operation]

Figure 4:
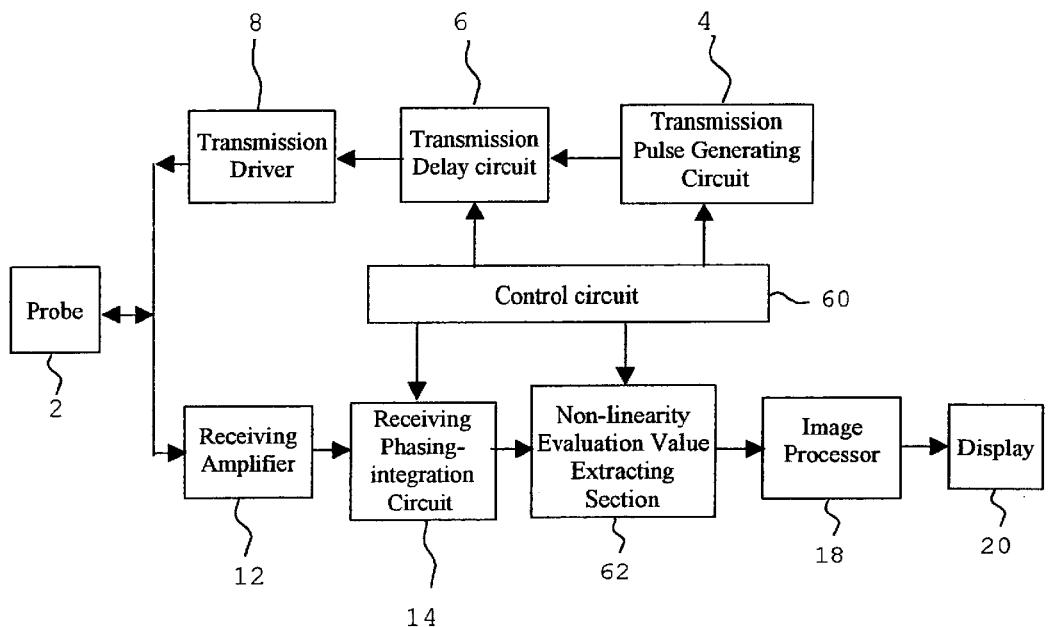
FIG. 4 is a block diagram showing a general configuration of an ultrasonic diagnosis apparatus in accordance with a second embodiment of the present invention.

The specific structure and operation of an ultrasonic diagnosis apparatus in accordance with the second embodiment of the present invention will next be described with reference to the accompanying drawings. FIG. 4 is a block diagram showing the general configuration of the present apparatus. In the following description, the same structural components as those in the apparatus according to the first embodiment are denoted by the same reference numerals, and their descriptions are simplified.

As in the apparatus of the first embodiment, the apparatus of the present embodiment simultaneously transmits the first fundamental and the second fundamental toward the living body, and receives echoes thereof.

The transmission system comprises the transmission pulse generating circuit 4, the transmission delay circuit 6 and the transmission driver 8. A control circuit 60 controls the transmission pulse generating circuit 4 and the transmission delay circuit 6 to thereby control the generation and direction of transmission beams.

As in the above-described first embodiment, the transmission system of the present apparatus sequentially transmits, in the same beam axial direction, two transmission signals of reverse polarity.

The receiving system comprises the receiving amplifier 12, the receiving phasing-integration circuit 14, a non-linearity evaluation value extracting section 62, the image processor 18 and the display unit 20. The receiving phasing-integration circuit 14 operates under the control of the control circuit 60.

Figure 5:
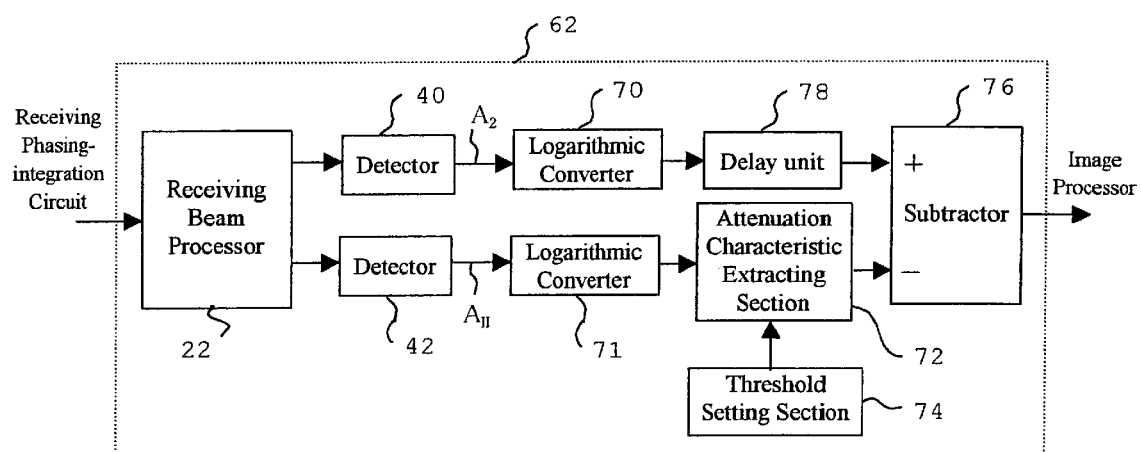
FIG. 5 is a block diagram showing an example general configuration of a non-linear evaluation value extracting section.

FIG. 5 is a block diagram showing an example general configuration of the non-linearity evaluation value extracting section 62. In the non-linearity evaluation value extracting section 62, the receiving beam processor 22 generates a sum signal and a difference signal from the receiving signals corresponding to the transmission signals reverse in polarity to one another. Each of the sum signal and difference signal output from the receiving beam processor 22 has the center frequency $2f_0$. The detectors 40 and 42 detect the sum and difference signals by envelope detection, and extract the envelope amplitude signals of those signals. The amplitude signal output from the detector 40 represents a change over time in the amplitude $A_2$ of the secondary harmonic component generated within the body, whereas the amplitude signal output from the detector 42 represents a change over time in the echo amplitude $A_{II}$ of the second fundamental component. The outputs of the detectors 40 and 42 are logarithmically converted by logarithmic converters 70 and 71, respectively. The signal $\log A_2$ is output from the logarithmic converter 70, and the signal $\log A_{II}$ is output from the logarithmic converter 71.

The output $\log A_{II}$ from the logarithmic converter 71 is input to an attenuation characteristic extracting section 72. A threshold level is designated in the attenuation characteristic extracting section 72 by a threshold setting section 74, and the attenuation characteristic extracting section 72 executes the process described in the next paragraph. The output from the attenuation characteristic extracting section 72 is input to the subtractor 76. Meanwhile, the output $\log A_2$ of the logarithmic converter 70 is input to the subtractor 76 via a delay unit 78. The delay unit 78 is designed so as to synchronize the signal $\log A_2$ with the output signal from the attenuation characteristic extracting section 72.

Figure 6:
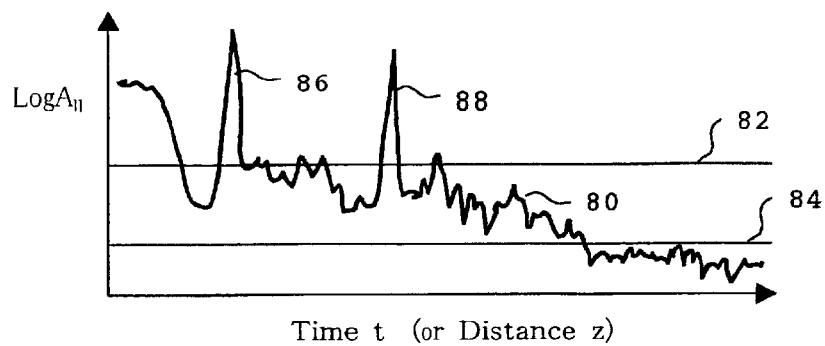
FIG. 6 is a diagram for explaining a processing conducted by the attenuation characteristic extracting section.
Figure 7:
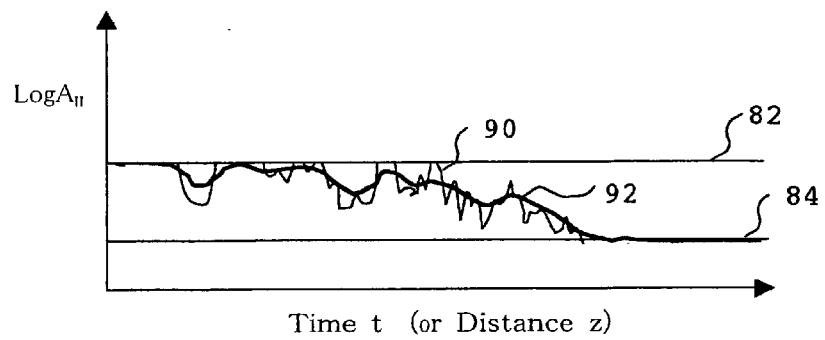
FIG. 7 is a diagram for explaining a processing conducted by the attenuation characteristic extracting section.

FIGS. 6 and 7 are diagrams for explaining the process executed by the attenuation characteristic extracting section 72. In FIGS. 6 and 7, the vertical axis represents $\log A_{II}$. The horizontal axis represents time t which corresponds to the distance z from the probe 2. A characteristic 80 shown in FIG. 6 is an output signal from the logarithmic converter 71. This output signal undergoes a gradual reduction due to the attenuation characteristic α while fluctuating in a relatively small time scale in response to the backscattering characteristic γ at respective points in the body tissue. In accordance with the control of the control circuit 60, the threshold setting section 74 sets an upper threshold 82 and a lower threshold 84 corresponding to the characteristic 80. The upper threshold 82 is set such that strong reflections and scattering echo can be clipped. The lower threshold 84 is set slightly higher than the noise level such that the noise can be clipped.

When the characteristic 80 has a value exceeding the upper threshold 82, the attenuation characteristic extracting section 72 performs the clipping process using the upper threshold 82 to replace the exceeding value by the value of the upper threshold 82. As a result, for example, peaks 86 and 88 of the signal are removed. Through the clipping process, the backscattering characteristic γ can be reduced where clipping is performed. Further, when the characteristic 80 has a value below the lower threshold 84, the attenuation characteristic extracting section 72 similarly replaces that value by the value of the lower threshold 84.

A characteristic 90 shown in FIG. 7 represents a signal obtained by clipping the characteristic 80. The attenuation characteristic extracting section 72 additionally smoothes the characteristic 90 obtained after clipping. The curve 92 represents the signal $<\log A_{II}>$ obtained as a result of the smoothing process. In this specification, a symbol $<S>$ denotes a signal obtained through processing of a signal S by the attenuation characteristic extracting section 72. Through the smoothing process, local fluctuations caused by the backscattering characteristic γ are suppressed, while the gradual fluctuations caused by the attenuation characteristic α are substantially preserved.

Figure 8:
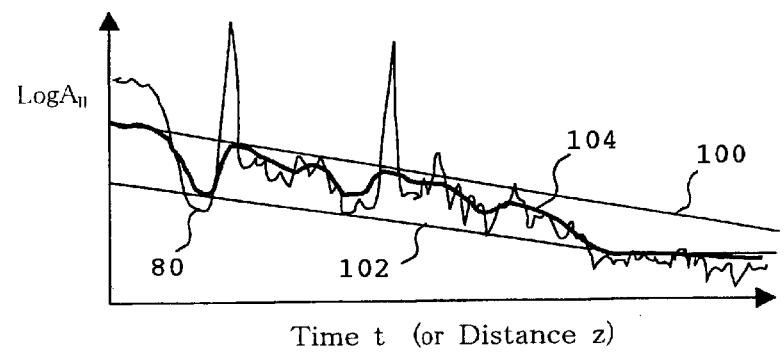
FIG. 8 is a diagram illustrating a case in which thresholds set in the attenuation characteristic extracting section are decreased in association with an increase in distance z.

In the above example, the thresholds 82 and 84 are set to constant levels regardless of the distance z. However, as the level of the signal $A_{II}$ basically decreases with an increase in the distance z because of the attenuation characteristic α, it is also preferable to set the threshold levels to gradually decrease as the distance z increases. FIG. 8 is an explanatory diagram showing a case in which the threshold levels are decreased along with an increase in the distance z. In the figure, the characteristic 80 is clipped based on an upper threshold 100 and a lower threshold 102, then smoothed to be converted into a signal represented by a curve 104.

Through the above-described processing of the attenuation characteristic extracting section 72, the influence of backscattering characteristic γ of the input signal $\log A_{II}$ is suppressed, thereby generating the attenuation characteristic signal $<\log A_{II}>$ mainly comprising the influence of the attenuation characteristic α included in the signal $\log A_{II}$. After being output from the attenuation characteristic extracting section 72, the signal $<\log A_{II}>$ is input to the subtractor 76.

The subtractor 76 subtracts the signal $<\log A_{II}(z)>$ from the signal $\log A_2(z)$. This can be expressed as:

$$\log[A_2(z)/<A_{II}(z)>]=\log A_2(z)-<\log A_{II}(z)> \qquad (8)$$

From this equation, it can be understood that the processing of the subtractor 76 corresponds to the logarithmic conversion performed after the processing of the divider 44 in the first embodiment. In other words, the processing of the equation (7) described in the principle is executed by the subtractor 76. As a result, the attenuation characteristic α is removed from the signal $\log[A_2(z)/<A_H(z)>]$. Further, the signal $\log[A_2(z)/<A_H(z)>]$ retains the backscattering characteristic γ by an amount corresponding to the amount of the backscattering characteristic γ removed from $<\log A_H(z)>$. Specifically, in a portion such as the peaks 86 and 88 where the reflection and scattering are strong, γ is greatly reduced in $<\log A_H(z)>$ by clipping. As a result, γ remains in the signal $\log[A_2(z)/<A_H(z)>]$ to a significant extent, making the signal value greater.

Accordingly, the image generated by the image processor 18 using the signal $\log[A_2(z)/<A_H(Z)>]$ not only displays the information of the secondary harmonic component generated in the body, but also clearly expresses the body tissue structures. In particular, a clipped portion which generated strong reflection and scattering echo is displayed with high brightness. As in the first embodiment, the attenuation characteristic α is removed for each of the ultrasonic beams along the ultrasonic beam axis. By thus correcting the attenuation generated in the depthwise direction at a high accuracy for each of the ultrasonic beams, a tomographic image having a high quality can be obtained.

Figure 9:
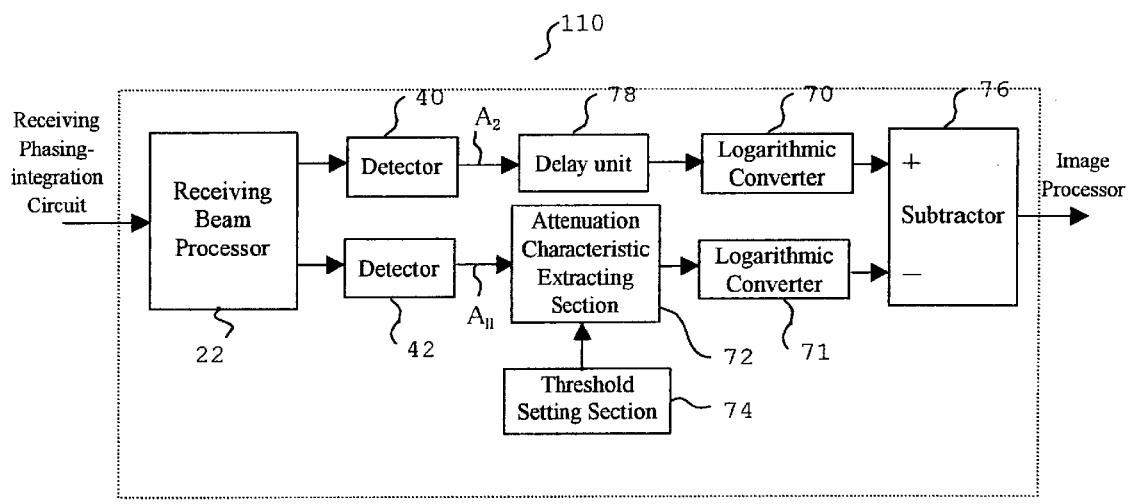
FIG. 9 is a block diagram showing another example general configuration of a non-linear evaluation value extracting section.

FIG. 9 is a block diagram showing another example general configuration of the non-linearity evaluation value extracting section. The main difference between the non-linearity evaluation value extracting section 110 and the above-noted non-linearity evaluation value extracting section 62 is that the order of arrangement of the logarithmic converter 71 and the attenuation characteristic extracting section 72 is reversed. In other words, in the non-linearity evaluation value extracting section 110 shown in FIG. 9, the logarithmic conversion is executed after the clipping and smoothing processes. The same effect as that of the non-linearity evaluation value extracting section 62 can similarly be obtained using the non-linearity evaluation value extracting section 110.

Figure 10:
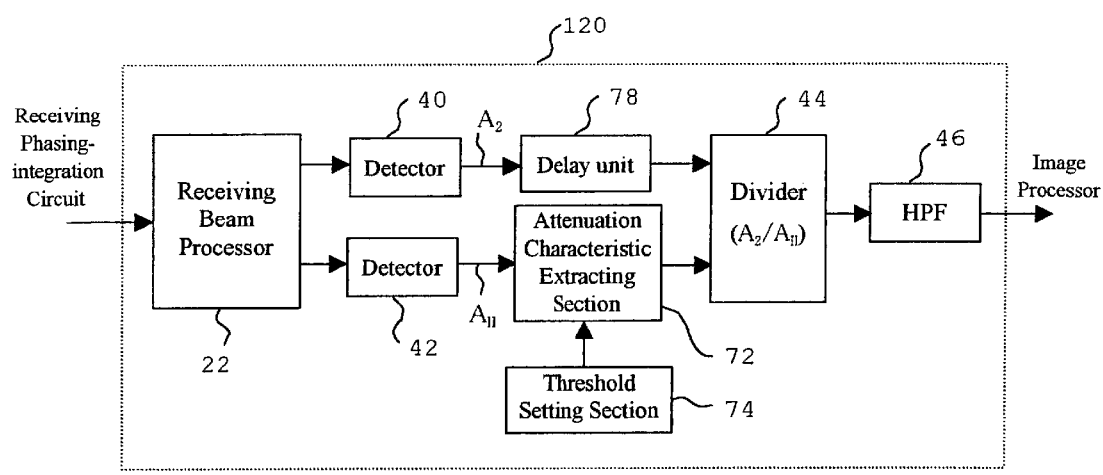
FIG. 10 is a block diagram showing still another example general configuration of a non-linear evaluation value extracting section.

FIG. 10 is a block diagram showing still another example general configuration of the non-linearity evaluation value extracting section. In the non-linearity evaluation value extracting section 120, the signals $A_2$ and $A_H$ are not subjected to logarithmic conversion. Instead, the divider 44 is employed as in the first embodiment. The output signal $A_H$ from the detector 42 is input to the attenuation characteristic extracting section 72. The attenuation characteristic extracting section 72 generates the signal $<A_H>$ from which the influence of scattering characteristic γ is removed or reduced. The signal $<A_H>$ and the output signal $A_2$ of the detector 40 are input to the divider 44, and the divider 44 calculates and outputs the ratio ($A_2/<A_H>$) of those signals. The non-linearity evaluation value extracting section 120 further includes the HPF 46. As in the first embodiment, the HPF 46 is a differentiator for obtaining the change ratio over time of the result of division by the divider 44. Using the HPF 46, a difference in the ratio ($A_2/<A_H>$) between depths close to one another can be obtained. It is to be noted that the HPF 46 can also be employed in a non-linearity evaluation value extracting section that executes logarithmic conversions as shown in FIGS. 8 and 9. In such a case, the apparatus can be configured so as to form an image based on the differentiated signal.

Moreover, the non-linearity evaluation value extracting section may also be configured to execute only one of the above-described clipping process and smoothing process such as, for example, only the clipping process using thresholds. Even when using such an arrangement, the attenuation characteristic can be removed or reduced in each of the ultrasonic beams while retaining the backscattering characteristic.

According to the ultrasonic diagnosis apparatus of the present invention, in order to acquire information reflecting the non-linear parameter at high precision, transmission and reception of ultrasound each need only be conducted twice for one beam direction. In this way, simplification of the configuration and processing of the apparatus is accomplished. Further, the secondary harmonic component having weak intensity can be extracted at high precision even when using a fundamental having a broad band. A broad band fundamental can therefore be used to acquire non-linear parameter information having enhanced axial resolution, and an image based on such information.

Furthermore, according to the ultrasonic diagnosis apparatus of the present invention, the influence of the attenuation characteristic α is removed or reduced from the secondary harmonic for each of the ultrasonic beams, and an image is formed using a signal in which information on the body tissue structure remains. Accordingly, an image clearly expressing the body tissue structure can be obtained.

What is claimed is:

1. An ultrasonic diagnosis apparatus comprising:
    a transmitter for transmitting toward a living body a first transmission signal and a second transmission signal reverse in polarity to said first transmission signal, the first transmission signal containing a first fundamental component of a center frequency $f_0$ and a second fundamental component of a center frequency $2f_0$;
    a receiver for outputting a first receiving signal corresponding to an echo of said first transmission signal and a second receiving signal corresponding to an echo of said second transmission signal;
    a sum signal generator for generating a sum signal based on addition of said first receiving signal and said second receiving signal;
    a difference signal generator for generating a difference signal based on subtraction between said first receiving signal and said second receiving signal; and
    an evaluation value calculator for calculating an evaluation value based on said sum signal and said difference signal.

2. An ultrasonic diagnosis apparatus according to claim 1, wherein said transmitter includes
    a first fundamental generator for generating said first fundamental component; and
    a second fundamental generator for generating said second fundamental component.

3. An ultrasonic diagnosis apparatus according to claim 1, wherein said difference signal generator extracts, as said difference signal, said second fundamental component included in the subtraction result between said first receiving signal and said second receiving signal.

4. An ultrasonic diagnosis apparatus according to claim 3, wherein said difference signal generator has a band pass filter which passes and extracts said second fundamental component included in said subtraction result.

5. An ultrasonic diagnosis apparatus according to claim 1, wherein said evaluation value calculator calculates an amplitude ratio of said sum signal and said difference signal, and obtains said evaluation value based on said amplitude ratio.

6. An ultrasonic diagnosis apparatus according to claim 1, further comprising
    a detector for detecting the respective amplitude modulations of said sum signal and said difference signal; wherein said evaluation value calculator calculates said evaluation value based on a detection signal output from said detector, said detection signal corresponding to each of said sum signal and said difference signal.

7. An ultrasonic diagnosis apparatus according to claim 5, further comprising a differentiator for calculating a ratio of change over time of the amplitude ratio.

8. An ultrasonic diagnosis apparatus according to claim 7, wherein said differentiator comprises a high pass filter.

9. An ultrasonic diagnosis apparatus according to claim 1, further comprising an image generator for generating a tomographic image based on said evaluation value of a sectional plane of the body.

10. An ultrasonic diagnosis apparatus comprising:
a transmitter for transmitting toward a living body a first transmission signal and a second transmission signal reverse in polarity to said first transmission signal, the first transmission signal containing a first fundamental component of a center frequency $f_0$ and a second fundamental component of a center frequency $2f_0$;
a receiver for outputting a first receiving signal corresponding to an echo of said first transmission signal and a second receiving signal corresponding to an echo of said second transmission signal;
a sum signal generator for generating a sum signal based on addition of said first receiving signal and said second receiving signal;
a difference signal generator for generating a difference signal based on subtraction of said first receiving signal and said second receiving signal;
an attenuation characteristic signal generator for generating, in accordance with said difference signal, an attenuation characteristic signal representative of the attenuation characteristic of the ultrasound corresponding to a depth; and
a normalization circuit for normalizing said sum signal by using said attenuation characteristic signal, so as to output a normalization signal.

11. An ultrasonic diagnosis apparatus according to claim 10, further comprising a differentiator for differentiating said normalization signal to output a differentiation signal.

12. An ultrasonic diagnosis apparatus according to claim 10, wherein said attenuation characteristic signal generator suppresses a level fluctuation of said difference signal to generate said attenuation characteristic signal.

13. An ultrasonic diagnosis apparatus according to claim 10, wherein said attenuation characteristic signal generator clips a level fluctuation of said difference signal at a predetermined level and smoothes the difference signal after clipping, so as to generate said attenuation characteristic signal.

14. An ultrasonic diagnosis apparatus according to claim 13, wherein said predetermined level is a function of the depth.

15. An ultrasonic diagnosis apparatus comprising:
a transmitter for transmitting toward a living body a first transmission signal and a second transmission signal reverse in polarity to said first transmission signal, the first transmission signal containing a first fundamental component of a center frequency $f_0$ and a second fundamental component of a center frequency $2f_0$;
a receiver for outputting a first receiving signal corresponding to an echo of said first transmission signal and a second receiving signal corresponding to an echo of said second transmission signal;
a sum signal generator for generating a sum signal based on addition of said first receiving signal and said second receiving signal;
a difference signal generator for generating a difference signal based on subtraction of said first receiving signal and said second receiving signal;
a first logarithmic converter for logarithmically converting said sum signal to output a logarithmic format sum signal;
a second logarithmic converter for logarithmically converting said difference signal to output a logarithmic format difference signal;
an attenuation characteristic signal generator for generating, in accordance with said logarithmic format difference signal, a logarithmic format attenuation characteristic signal representative of the attenuation characteristic of the ultrasound corresponding to a depth; and
a normalization circuit for normalizing said logarithmic format sum signal by using said logarithmic format attenuation characteristic signal, so as to output a logarithmic format normalization signal.

16. An ultrasonic diagnosis apparatus comprising:
a transmitter for transmitting toward a living body a first transmission signal and a second transmission signal reverse in polarity to said first transmission signal, the first transmission signal containing a first fundamental component of a center frequency $f_0$ and a second fundamental component of a center frequency $2f_0$;
a receiver for outputting a first receiving signal corresponding to an echo of said first transmission signal and a second receiving signal corresponding to an echo of said second transmission signal;
a sum signal generator for generating a sum signal based on addition of said first receiving signal and said second receiving signal;
a difference signal generator for generating a difference signal based on subtraction of said first receiving signal and said second receiving signal;
a first logarithmic converter for logarithmically converting said sum signal to output a logarithmic format sum signal;
an attenuation characteristic signal generator for generating, in accordance with said difference signal, an attenuation characteristic signal representative of the attenuation characteristic of the ultrasound corresponding to a depth;
a second logarithmic converter for logarithmically converting said attenuation characteristic signal to output a logarithmic format attenuation characteristic signal; and
a normalization circuit for normalizing said logarithmic format sum signal by using said logarithmic format attenuation characteristic signal, so as to output a logarithmic format normalization signal.

17. A measuring method using ultrasound, comprising:
a first transmitting step of transmitting toward a living body a first transmission signal containing a first fundamental component of a center frequency $f_0$ and a second fundamental component of a center frequency $2f_0$;
a first receiving step of receiving an echo of said first transmission signal and outputting a first receiving signal corresponding to said echo;
a second transmitting step of transmitting toward a living body a second transmission signal reverse in polarity to said first transmission signal;

a second receiving step of receiving an echo of said second transmission signal and outputting a second receiving signal corresponding to said echo;

a first mixing step of generating a first mixed signal based on addition of said first receiving signal and said second receiving signal;

a second mixing step of generating a second mixed signal based on subtraction between said first receiving signal and said second receiving signal; and an evaluation value calculating step of calculating an evaluation value based on said first mixed signal and said second mixed signal.

18. A measuring method using ultrasound, comprising:

a first transmitting step of transmitting toward a living body a first transmission signal containing a first fundamental component of a center frequency $f_0$ and a second fundamental component of a center frequency $2f_0$;

a first receiving step of receiving an echo of said first transmission signal and outputting a first receiving signal corresponding to said echo;

a second transmitting step of transmitting toward a living body a second transmission signal reverse in polarity to said first transmission signal;

a second receiving step of receiving an echo of said second transmission signal and outputting a second receiving signal corresponding to said echo;

a first mixing step of generating a first mixed signal based on addition of said first receiving signal and said second receiving signal;

a second mixing step of generating a second mixed signal based on subtraction between said first receiving signal and said second receiving signal;

an attenuation characteristic signal generating step of generating, in accordance with said second mixed signal, an attenuation characteristic signal representative of the attenuation characteristic of the ultrasound corresponding to a depth; and a normalizing step of normalizing said first mixed signal by using said attenuation characteristic signal, so as to output a normalization signal.

* * * * *